Figure 1:
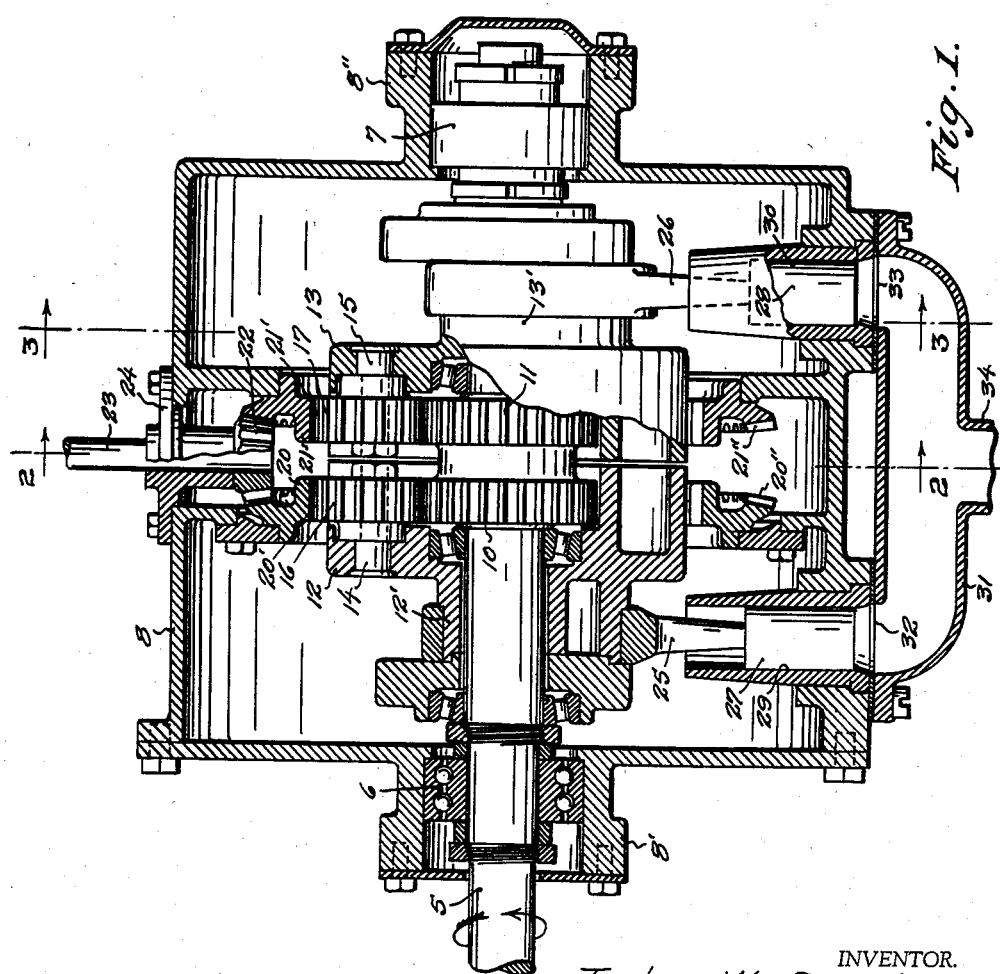

Feb. 20, 1945.　　T. W. SPRAKE　　2,369,867
VARIABLE-DELIVERY PUMP
Filed Sept. 14, 1942　　2 Sheets-Sheet 1

INVENTOR.
Tyler W. Sprake
BY
atty

Feb. 20, 1945. T. W. SPRAKE 2,369,867
VARIABLE-DELIVERY PUMP
Filed Sept. 14, 1942 2 Sheets-Sheet 2

INVENTOR.
Tyler W. Sprake
BY
atty

Patented Feb. 20, 1945

2,369,867

UNITED STATES PATENT OFFICE 2,369,867

VARIABLE-DELIVERY PUMP

Tyler W. Sprake, Seattle, Wash., assignor to Webster-Brinkley Co., Seattle, Wash., a corporation of Washington Application September 14, 1942, Serial No. 458,342

3 Claims. (Cl. 103—37)

This invention relates to variable-delivery pumps, and has for its object the perfection of pumps of this nature by providing a structure including reciprocally-mounted pumping pistons working in pairs with a constant stroke and relying, for the accomplishment of the regulatory function, upon a variable-phase operation.

With this and other objects and advantages in view, the invention consists in certain novel details of construction and combinations of parts, as will be hereinafter fully described and finally pointed out in the annexed claims.

In the drawings—

Figure 3:
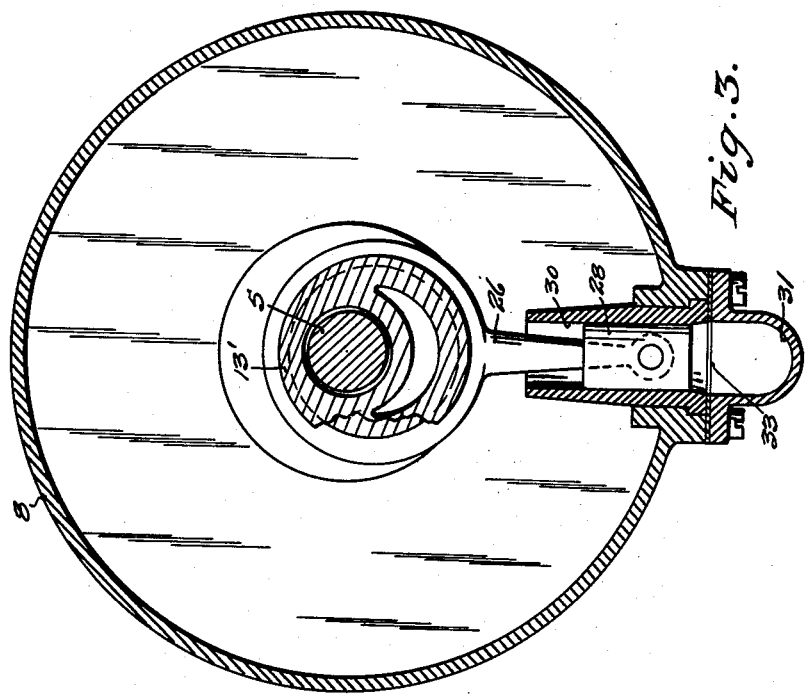
Figure 2:
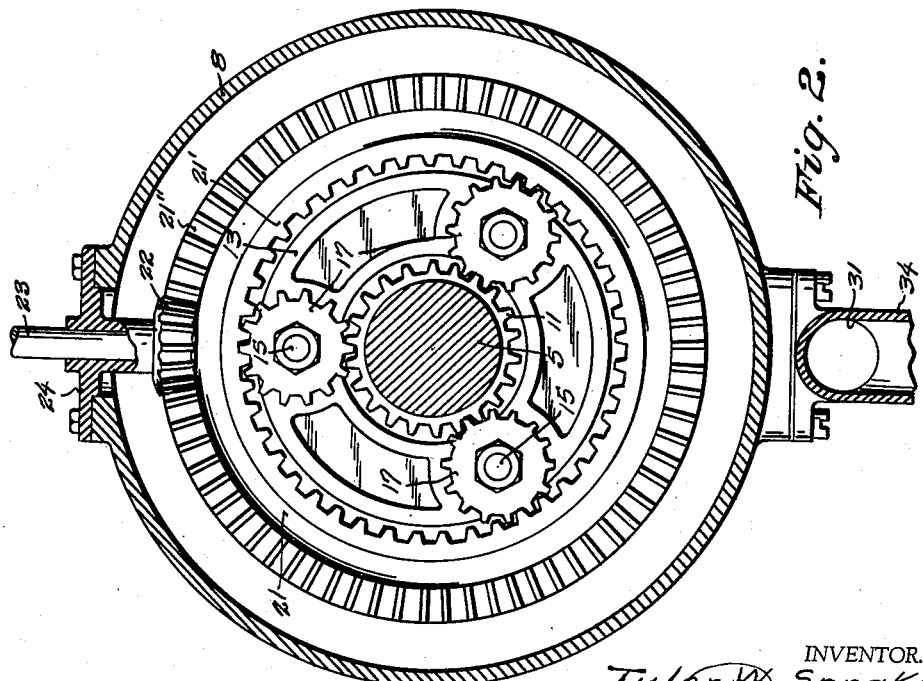

Figure 1 is a vertical section with parts in elevation and other parts shown fragmentarily taken on the longitudinal median line of a variable-delivery pump embodying the invention; and Figs. 2 and 3 are transverse vertical sections on the respective section lines 2—2 and 3—3 of Fig. 1.

The reference numeral 5 designates a suitably driven power shaft journaled in bearings 6 and 7 received in the end boxes 8' and 8'' of a casing 8, and formed as an integral enlargement of the shaft to lie centrally of the casing are paired spur pinions 10 and 11. At each side of these paired spur pinions there is journaled upon the shaft a revoluble cage, as 12 and 13, and carried by these cages are stud shafts 14 and 15 supporting planetary gears 16 and 17 to have the latter mesh the teeth of the spur pinions. For imparting responsive planetary motion to the said planetary gears 16 and 17, the latter track in the respective instance upon internal gears 20' and 21' provided in rings 20 and 21. The rings are given a bearing within the casing accommodating relative revoluble shifting movements, one as respects the other ring, and for effecting such movement the rings are each formed with an external bevel gear, as 20'' and 21'', arranged to mesh an interposed bevel pinion 22 fixedly mounted upon a control spindle 23. The said control spindle, regulated by suitable control mechanism, is supported in radial relation to the power shaft of the pump by a casing-fixed bearing bracket 24.

Reverting to the cages, it will be seen that I form the same with sheave-hubs 12' and 13' correspondingly developed about axes off-set from the axis of the supporting power shaft to produce eccentrics, and these eccentrics, by which term the sheave-hubs will be hereinafter designated, operate through connecting rods 25 and 26 in the respective instance to drive reciprocally mounted pistons 27 and 28 working in cylinders 29 and 30.

The invention provides a manifold 31 which is common to both of the cylinders and connects therewith through the branch openings 32—33, and communicating with this manifold is a pipe 34 whose flow capacity equals or exceeds the combined capacities of the two cylinders. Finding connection through non-return valves with the pipe 34 are the induction and the eduction pipes for the pump, neither of the latter said pipes nor the non-return valves therefor being shown.

The operation of the invention is as follows:

Assuming the two eccentrics to occupy the relative positions in which the same are illustrated, and with the bevel pinion 22 held against turning movement—locking the ring gears—it follows that the two pistons 27—28 move in exact unison with the suction and exhaust strokes of the one coinciding with the corresponding strokes of the other. Each said piston will therefor draw and expel a full fluid charge in each two-stroke cycle, and the pump will in consequence work at full capacity, which is to say at the combined capacities of the two cylinders. Assuming, now, that the control spindle is revolved such that the crowns of the two eccentrics lie diametrically opposite from one another—the resultant of an opposite directive travel having been imparted through the bevel pinion to the two ring gears 20'—21'—it will be apparent that the suction stroke of the one piston is in coincidence with the exhaust stroke of the other and the two pistons balance in that the fluid charge simply passes through the manifold from one to the other cylinder, output being zero. It will be similarly understood that an intermediate positioning of the control spindle such that one eccentric would be caused to precede the other by a 90° lead would produce correspondence in the directional travel of the two pistons through one-half the stroke and develop a pumping output 50% of capacity. Enlarging further on the exactitude with which the pump may be governed for variable delivery within a complete range from zero to full capacity is believed to be unnecessary, intermediate adjustments other than the example given being thought self-evident. It will of course be understood that multiple sets of paired radial pistons distributed at circumferentially spaced intervals about the power shaft of the pump would, for each such set, duplicate the operation of the described single unit.

While having particularly described one embodiment of the invention I intend that no limitations be implied therefrom, the expectation being that the hereto annexed claims will be read with only such restrictions as are necessarily introduced thereto to distinguish from prior knowledge in the art.

What I claim is:

1. In a variable-delivery pump: the combination of a pair of axially spaced apart cage members journalled for revoluble movements about a common axis, and each provided with an eccentric hub; planetary gears carried by each of the cage members; ring elements surrounding the planetary gearing of the respective cage members and providing internal gears in mesh with the planetary gears, said ring elements being mounted for independent revoluble shifting movements about the center of the cage members as an axis; power-driven pinions meshing the respective planetary gearing to cause the latter to move planetarily upon the ring elements and responsively impart revoluble movement through the cage members to the eccentric hubs, said hubs, the planetary gearing, the internal gears, and the driving pinions being alike for each of the two cage members; like pumping units for the respective cage members comprised of radially-located cylinders, pistons therefor, and connecting rods for the pistons driven from the eccentrics; a manifold common to the two cylinders having non-return induction and eduction passages to and from the same; and control devices for imparting relative revoluble shifting movements to the two ring elements for bodily shifting the planetary gearing and thereby varying the pumping phase of one as respects the other of the two pumping units.

2. The variable-delivery pump of claim 1 in which said control devices are comprised of a journaled pinion interposed between the ring elements and meshing the teeth of a gear provided by each said ring element.

3. In a variable-delivery pump: the combination of a pair of axially spaced cage members journaled for revoluble movements about a common axis and each provided with an eccentric hub; respective gears carried for planetary movement by the cage members; ring elements for respective cage members surrounding related planetary gears and providing internal gears in mesh with the latter, said ring gears being arranged for relative rotary shifting movement about the center of the cage members as an axis; a sun gear acting to drive the planetary gearing and, through the planetary travel of the latter, responsively activating the cage members to rotate the hubs of the latter, said hubs, the planetary gears, and the internal gears being alike for each of the two cage members; like pumping units for the respective cage members comprising reciprocating pistons, and cylinders therefor, powered from the eccentrics; a manifold common to the two cylinders having non-return induction and eduction passages to and from the same; and a control for the said relative rotary shifting of the ring gears.

TYLER W. SPRAKE.